United States Patent Office 3,281,407
Patented Oct. 25, 1966

3,281,407
PROCESS FOR MAKING GLUTATHIONE
Gaston Dalby, New York, N.Y., assignor of one-half to Benjamin T. Rauber, New York, N.Y.
No Drawing. Filed June 6, 1963, Ser. No. 285,893
5 Claims. (Cl. 260—112.5)

My present invention relates to an improved process for obtaining purified glutathione from yeast.

Glutathione is a peptide unit consisting of one molecule each of glutamic acid, cysteine and glycine. The cysteine of glutathione contains sulphur in a sulphydryl or —SH group. Glutathione may also exist in an oxidized state in which two molecules of glutathione are joined by a disulphide linkage —S—S—. Glutathione is concentrated in yeast cells in the region just inside the wall of the yeast cell.

In the process of making an inactive dry yeast by the process described in patent of Dalby and Fisher, No. 3,150,061, September 22, 1964, yeast is grown in an aqueous nutrient medium, the yeast cells are separated from the aqueous medium to form a slurry, and this slurry is then heated to a temperature just below the boiling point of water until the yeast cells are killed. Then the glutathione is extracted with water, passing through the cell walls of the yeast cells. The walls of the yeast cells are substantially impermeable to the contents of the yeast cells other than glutathione and these contents therefore remain in the cells.

The water containing the glutathione is separated from the yeast cells, which are then dried to form an inactive dry yeast free from glutathione for the baking industry. This separation may be made by filtration, centrifuging, or other known means.

The filtrate, free from the yeast cells and their content, contains glutathione in both the oxidized and reduced forms, that is, glutathione consisting of two molecules linked by a disulphide or —S—S— linkage and glutathione having a sulphydryl or —SH group.

To free the glutathione of any impurities that may be dissolved in the water, it is precipitated as an insoluble copper compound and then after filtration is freed from the combined copper by means of hydrogen sulphide and recrystallized. Copper combines with the reduced form of the glutathione but does not combine with the oxidized form containing the disulphide linkage. The oxidized form of the glutathione is herefore reduced to the reduced form before being reacted with the copper salt to form a precipitate. This reduction is accomplished by any suitable reducing agent of which a large number is known in the chemical literature, such as hydrogen with a suitable catalyst, hydroxylamine, low molecular weight reducing acids, such as ascorbic or isoascorbic acids and their salts, solutions of zinc in sulphosalicyclic acid, low molecular weight aldehydes such as pyruvic aldehyde. Ascorbic acid is preferred.

The process of purification and isolation of the glutathione is as follows:

The filtrate which contains the glutathione is treated as follows: It is acidified with sulphuric acid to make the solution 0.5 N. Then ascorbic acid is added. Any oxidized glutathione is reduced to the —SH form by the ascorbic acid. Then cuprous oxide is added. The insoluble copper compound of glutathione is formed and is separated from the filtrate by centrifuging or filtration. The precipitate is washed free of sulphates and suspended in water. Hydrogen sulphide is added by bubbling the gas through the liquid containing the copper glutathione compound. The copper is precipitated as the insoluble copper sulphide, the glutathione remaining dissolved in the filtrate. The precipitate of copper sulphide is filtered off, and the filtrate is evaporated under vacuum. The glutathione is taken up in hot 50% ethanol and when this solution is cooled the glutathione crystallizes out and is removed by filtration. The addition of the ascorbic acid, or a suitable reducing agent, such as isoascorbic acid, pyruvic acid, etc., is necessary as cuprous oxide will not form an insoluble copper compound with the oxidized form of glutathione.

An example of the process is as follows:

A yeast containing 600 parts of yeast solids is heated just to the boiling point of water. The yeast solids are removed by centrifuging or filtration. Sulphuric acid is added to the filtrate to give 0.5 N strength as sulphuric acid. 6 parts of ascorbic acid are added. Then 2 parts of cuprous oxide are added with stirring. The reaction mixture is then centrifuged and washed until the precipitate is free from sulphates. The precipitate is suspended in 100 parts of water and hydrogen sulphide is bubbled through the water until all of the copper is precipitated as copper sulphide. The filtrate is evaporated and the glutathione is purified by recrystallization from 50% ethanol. All parts are by weight.

Having described my invention, I claim:

1. A process of making glutathione from yeast which comprises heating a slurry of yeast cells to kill the yeast, extracting glutathione from the dead yeast cells with water, reducing the glutathione containing a double sulphur linkager to glutathione containing a sulphydryl group, adding a cuprous compound to the solution containing the reduced glutathione to precipitate a cuprous compound of glutathione, separating the precipitate of cuprous glutathione compound from the liquid, suspending the cuprous glutathione in water and precipitating the copper from the glutathione with hydrogen sulphide, separating the precipitate of copper sulphide from the solution of glutathione and evaporating the water to obtain said glutathione.

2. The process of claim 1 in which said glutathione is reduced with ascorbic acid.

3. The process of claim 1 in which the solution of glutathione obtained from the yeast cells is acidified to 0.5 N and said cuprous compound is cuprous oxide.

4. The process of claim 1 in which the final glutathione is dissolved in ethanol and recrystallized therefrom.

5. The process of claim 4 in which said ethanol is a 50% aqueous solution of ethanol.

References Cited by the Examiner
UNITED STATES PATENTS

| | | | |
|---|---|---|---|
| 2,376,186 | 5/1945 | Rapkine | 260—112.5 |
| 2,702,799 | 2/1955 | Laufer et al. | 260—112.5 |

FOREIGN PATENTS 668,576   12/1938   Germany.

LEWIS GOTTS, *Primary Examiner.*
PERRY A. STITH, *Assistant Examiner.*